United States Patent
Shinobu et al.

[11] Patent Number: 6,053,473
[45] Date of Patent: Apr. 25, 2000

[54] VALVE APPARATUS

[75] Inventors: Hideyuki Shinobu, Shiroishi; Kenichi Nomura, Sendai; Takumi Kimura, Miyagi-ken, all of Japan

[73] Assignee: Keihin Corporation, Tokyo, Japan

[21] Appl. No.: 09/190,133

[22] Filed: Nov. 12, 1998

[30] Foreign Application Priority Data

Nov. 12, 1997 [JP] Japan .................................. 9-310845

[51] Int. Cl.⁷ .................................................. F16K 31/06
[52] U.S. Cl. ................................ 251/129.19; 123/568.26; 335/255
[58] Field of Search .......................... 251/129.15, 129.19; 123/568.26, 568.21; 335/255, 270, 274, 277

[56] References Cited

U.S. PATENT DOCUMENTS

| | | | |
|---|---|---|---|
| 4,666,125 | 5/1987 | Marts et al. ........................ | 251/129.19 |
| 5,020,505 | 6/1991 | Grey et al. ............................... | 123/571 |
| 5,129,623 | 7/1992 | Lockwood .......................... | 123/568.26 |
| 5,460,146 | 10/1995 | Frankenberg ........................... | 123/571 |
| 5,593,132 | 1/1997 | Hrytzak ............................... | 251/129.15 |
| 5,626,165 | 5/1997 | Shinobu .................................. | 137/566 |
| 5,687,698 | 11/1997 | Mastro et al. ....................... | 335/255 X |
| 5,957,117 | 9/1999 | Everingham ....................... | 123/568.26 |

FOREIGN PATENT DOCUMENTS

8-114277  5/1996  Japan .

*Primary Examiner*—John Rivell
*Assistant Examiner*—Meredith H. Schoenfeld
*Attorney, Agent, or Firm*—Paul A. Guss

[57] ABSTRACT

A coupling means comprises a first retainer and a second retainer. The first and second retainers are fastened to a first annular groove and a second annular groove of a valve stem respectively, and they are fixed by an energizing action in the vertical direction effected by a second elastic member. The first retainer is energized upwardly by a first elastic member provided on a lower side of the first retainer, and it abuts against the lower surface of a projection of a plunger. In this arrangement, the plunger is displaced downwardly while pressing the first retainer. Thus, the valve stem is moved downwardly together with the first retainer.

20 Claims, 5 Drawing Sheets

VALVE APPARATUS

BACKGROUND OF THE INVENTION

1. Field of the Invention

The present invention relates to a valve apparatus for opening and closing a fluid flow passage. In particular, the present invention relates to a valve apparatus which is characterized by a coupling structure between a valve stem and a drive unit.

2. Description of the Related Art

An exhaust gas-recirculating valve has been hitherto used, for example, for removing harmful components discharged from the internal combustion engine. The exhaust gas-recirculating valve has a function to make communication between the intake system and the exhaust system of the internal combustion engine. The harmful components such as NOx contained in the exhaust gas are reduced by recirculating the exhaust gas discharged from the internal combustion engine to the intake system.

In general, the exhaust gas-recirculating valve includes a valve comprising a valve plug which is used to open and close a recirculating passage for making communication between the intake system and the exhaust system of the internal combustion engine. The valve plug is displaced by operating a drive unit by the aid of a valve stem to perform the opening and closing operation for the valve.

A coupling structure between a drive unit and a valve stem is disclosed, for example, in FIG. 1 of U.S. Pat. No. 5,020,505 (hereinafter referred to as "first illustrative conventional technique"). In the first illustrative conventional technique, a projection formed on an inner surface of a plunger is interposed by two disks which are secured to the valve stem so that the drive unit is coupled to the valve stem. A spring washer intervenes between the projection and the disk.

Another coupling structure between a drive unit and a valve stem is disclosed in FIG. 1 of Japanese Laid-Open Patent Publication No. 8-114277 (hereinafter referred to as "second illustrative conventional technique"). In the second illustrative conventional technique, a lower end of a plunger is allowed to abut against a washer which is secured to the valve stem so that the drive unit is coupled to the valve stem. A spring intervenes between the washer and the plunger.

Still another coupling structure between a drive unit and a valve stem is disclosed in FIG. 3 of U.S. Pat. No. 5,460,146 (hereinafter referred to as "third illustrative conventional technique"). In the third illustrative conventional technique, a lower end of a plunger is allowed to abut against an upper surface of a retainer which is secured to the valve stem by means of caulking so that the drive unit is coupled to the valve stem.

Still another coupling structure between a drive unit and a valve stem is disclosed in FIG. 1 of U.S. Pat. No. 5,593,132 (hereinafter referred to as "fourth illustrative conventional technique"). In the fourth illustrative conventional technique, a projection formed on an inner surface of a plunger is interposed by the aid of a spring washer between two members which are engaged with the valve stem so that the coupling is achieved. The lower limit position of the plunger is regulated by allowing a lower end of the plunger to abut against a rib formed on a bottom surface of a sleeve.

In the first illustrative conventional technique, the plunger and the valve stem are fixed to make displacement in an integrated manner. For this reason, when the valve stem is subjected to the valve-closing operation, the inertial force of the plunger is applied to the valve stem. Therefore, it is feared that when the valve plug coupled to the valve stem abuts against a valve seat, a strong shock is exerted between the valve plug and the valve seat, which may cause a damage.

On the other hand, in the second illustrative conventional technique, a predetermined period of time is required from the start of displacement of the plunger to the abutment of the plunger against the washer. For this reason, an inconvenience arises in that a slight time lag appears in the action of opening and closing the valve.

Further, in the third illustrative conventional technique, the retainer is caulked to the valve stem in a complicated manner. For this reason, the coupling operation for the retainer and the valve stem is complicated.

Furthermore, in the fourth illustrative conventional technique, the members for interposing the plunger are engaged with the valve stem. For this reason, a complicated operation should be performed to produce and assemble the respective members. The plunger and the valve stem are coupled to one another so that they are displaced in an integrated manner. For this reason, when the valve stem is subjected to the valve-closing operation, the inertial force of the plunger is applied to the valve stem, in the same manner as in the first illustrative conventional technique described above. Therefore, it is feared that when the valve plug coupled to the valve stem abuts against a valve seat, a strong shock is exerted between the valve plug and the valve seat, which may cause a damage. The lower limit position of the plunger is regulated by the abutment between the plunger and the rib formed on the bottom surface of the sleeve. Therefore, it is feared that the lower end of the plunger is damaged upon collision with the rib. When a coating layer is formed on the surface of the plunger, it is feared that the coating layer is peeled off.

SUMMARY OF THE INVENTION

According to the arrangement of the present invention, a retainer is fastened to a retainer-fastening section, and it is fixed by a retainer-fixing mechanism. Therefore, it is easy to perform the operation to attach the retainer to a valve stem. Further, neither vibration nor noise is generated from a contact portion between the retainer and the retainer-fastening section. Furthermore, the retainer is not disengaged from the valve stem.

A drive unit and the valve stem are coupled to one another by allowing the retainer fastened to the valve stem to abut against a plunger. Therefore, it is easy to couple the drive unit and the valve stem.

The valve stem and the plunger are not directly secured to one another. When the valve stem is displaced in a direction in which the retainer is separated from the plunger, the inertial force of the plunger is not applied to the valve stem. Accordingly, for example, when a valve plug, which is coupled to the valve stem, collides with a valve seat, it is possible to prevent the valve plug or the valve seat from occurrence of any damage or the like.

The valve stem and the plunger are not directly secured to one another. Accordingly, for example, any displacement in a direction perpendicular to the axis of the valve stem is allowable, which is caused by misalignment or defective shapes of the respective members concerning, for example, the plunger and the retainer for constructing the coupling structure. Therefore, the displacement action of the valve stem is prevented from occurrence of any defective action which would be otherwise caused by the displacement in the direction perpendicular to the axis of the valve stem.

In a preferred embodiment, the valve stem is provided with a stopper so that the movement range of the valve stem is regulated by allowing the stopper to abut against a movement range-regulating means. In this embodiment, any damage or the like does not occur, which would be otherwise caused, for example, such that the plunger, which is displaced together with the valve stem, collides with the bottom surface of a sleeve member.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The valve apparatus according to the present invention will be explained in detail below with reference to the accompanying drawings, as exemplified by preferred embodiments.

Figure 1:
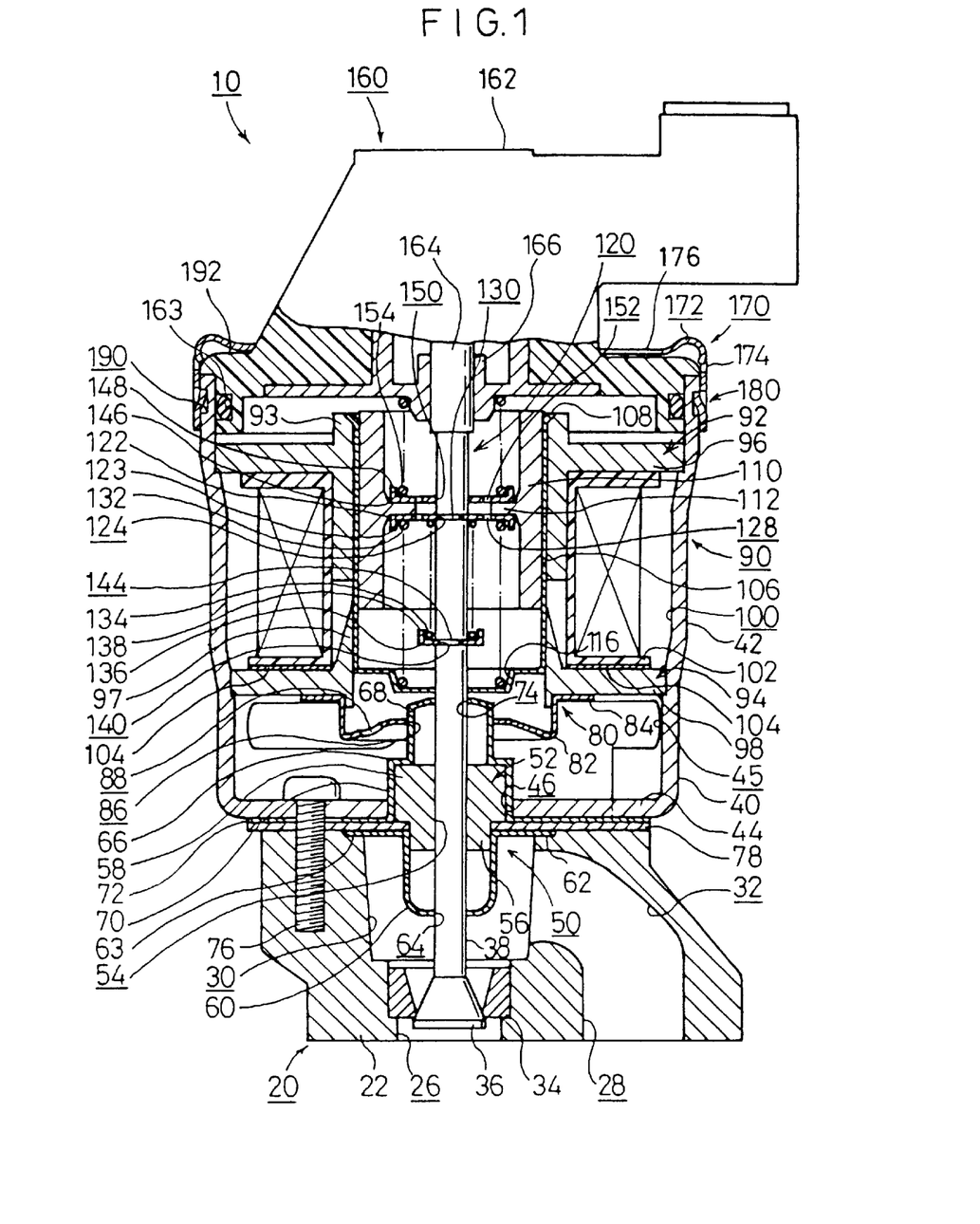
FIG. 1 shows a sectional view illustrating an exhaust gas-recirculating valve according to an embodiment of the present invention.

FIG. 1 shows an exhaust gas-recirculating valve 10 (hereinafter referred to as "EGR valve 10") to which the embodiment of the present invention is applied. The EGR valve 10 comprises a valve unit 20 for controlling circulation of exhaust gas from an exhaust system to an intake system of an unillustrated internal combustion engine connected to the EGR valve 10, a guide unit 50, a drive unit 90 for driving the valve unit 20, and a sensor unit 160 for measuring the open/closed state of the valve unit 20.

The valve unit 20 comprises a valve base 22. An inlet port 26 connected to the exhaust system of the internal combustion engine, and an outlet port 28 connected to the intake system of the internal combustion engine are defined, for example, through the lower surface of the valve base 22. The inlet port 26 and the outlet port 28 communicate with each other via an upper hole 30 defined above the inlet port 26 and a recirculating passage 32 defined above the outlet port 28 in the valve base 22. The upper hole 30 is formed to range from an upper portion of the inlet port 26 so that it is open at the upper surface of the valve base 22.

An annular valve seat 34 is arranged in the inlet port 26. A valve stem 38 is inserted into the valve seat 34, the valve stem 38 passing through the inlet port 26 and the upper hole 30 and penetrating through the valve base 22. A valve plug 36 is connected to the forward end of the valve stem 38. When the valve plug 36 is seated on the lower end of the valve seat 34, the inlet port 26 is closed. When the valve plug 36 is separated from the lower end of the valve seat 34, the inlet port 26 is open. The upper surface of the valve base 22 abuts against the lower surface of a housing 40 with a seal member 78 interposed therebetween as described later on. For example, the valve base 22 is fixed to the housing 40 by the aid of a plurality of screws 76.

The housing 40 is formed of, for example, a metal material. The housing 40 comprises a cylindrical side wall 42 and a bottom wall 44 which extends integrally from the lower end of the side wall 42 in the horizontal direction as shown in FIG. 1. The housing 40 is provided with a window 45 which extends over the side wall 42 and the bottom wall 44. The inside of the housing 40 communicates with the outside (atmospheric air) via the window 45. A hole 46 is defined through a substantially central portion of the bottom wall 44. The valve stem 38 is coaxially inserted to penetrate through a guide member 52 of the guide unit 50 which is fitted to the hole 46. That is, the valve stem 38, which is inserted into the housing 40, is supported by the guide unit 50.

The guide member 52 is formed of a heat-resistant material (for example, carbon sintered compact). The guide member 52 has a substantially cylindrical configuration through which a stem insertion hole 54 is defined. The guide member 52 is constructed by an integrated formed product having large and small different diameters, comprising a diametrally large section 58 disposed upward and a diametrally small section 56 disposed downward. The guide member 52 is internally interposed by a first guide cover 60 and a second guide cover 66 each of which is formed of a heat-resistant material and arranged coaxially with the valve stem 38, and it is shielded from the outside thereby. In this embodiment, spaces are formed between the first guide cover 60 and the lower surface of the guide member 52 and between the second guide cover 66 and the upper surface of the guide member 52 respectively.

The first guide cover 60 is formed to have a substantially cup-shaped configuration with an internal diameter corresponding to the diametrally small section 56 of the guide member 52. A first flange 62 is provided in an integrated manner at the open upper end of the first guide cover 60 so that it is directed externally. A first hole 64, through which the valve stem 38 is inserted, is defined through the closed bottom surface of the first guide cover 60. The first guide cover 60 is inserted into the upper hole 30 of the valve unit 20 with the first flange 62 being disposed upward. The first guide cover 60 is fitted and fastened to an annular groove 63 defined at a central portion of the upper surface of the valve base 22 by the aid of the first flange 62.

The second guide cover 66 is formed to have a substantially cup-shaped configuration with its upper portion which is formed as a diametrally small section 68 having a small diameter as compared with its lower portion, and with its lower portion which is formed as a diametrally large section 70 corresponding to the diametrally large section 58 of the guide member 52. A second hole 74, through which the valve stem 38 is inserted, is defined through the closed upper surface of the second guide cover 66. A second flange 72 is provided in an integrated manner at the open lower end of the second guide cover 66 so that it is directed externally.

The second guide cover 66 is inserted from the hole 46 into the housing 40 with the second flange 72 being disposed downward. The second guide cover 66 is fastened to the lower surface of the housing 40 by the aid of the second flange 72. This arrangement allows the guide member 52 to be shielded from the bottom portion of the housing 40 by the second guide cover 66. The guide member 52 is prevented from invasion of contaminated water or the like which have entered the housing 40.

The first flange 62 and the second flange 72 are interposed by the lower surface of the housing 40 and the upper surface of the valve base 22 in a state in which a seal member 78 intervenes therebetween. The first flange 62 and the second flange 72 are fixed by the plurality of screws 76 as described above. In this embodiment, the valve stem 38 is inserted into the guide unit 50 through the stem insertion hole 54, the first hole 64, and the second hole 74. The valve stem 38 is supported displaceably along the axial direction.

A cover section 80 comprises a substantially cup-shaped cover member 82. A flange 84 is provided in an integrated manner at the open upper end of the cover member 82 so that it is directed externally. The bottom surface of the cover member 82 is formed to have a convex configuration inclined upwardly and inwardly. A hole 86, which has a diameter corresponding to the diametrally small section 68 of the second guide cover 66, is defined through a substantially central portion of the cover member 82. A plurality of vent holes 88 are defined around the hole 86. The flange 84 of the cover member 82 is secured to a second support member 94 by means of welding or the like as described later on. The diametrally small section 68 of the second guide cover 66 is fitted into the hole 86.

In this embodiment, the cover member 82 is fixed while extending over the second support member 94 and the diametrally small section 68. Therefore, the cover member 82 intervenes among the bottom portion of the housing 40 (space formed among the bottom wall 44, the side wall 42, a second support member 94, and the bottom surface of a sleeve member 106 as described later on), the drive unit 90 (especially on the side of the sleeve member 106), and the second hole 74 of the second guide cover 66. As described above, the bottom surface of the cover member 82 is formed to have the convex configuration inclined upwardly ranging from its circumferential edge to its central portion. Accordingly, contaminated water or the like, which has entered the cover member 82 via the vent holes 88, is accumulated in a concave portion formed around the convex portion. The contaminated water passes through the vent holes 88 again, and thus it is discharged. Therefore, the inside of the second guide cover 66 (guide member 52) and the drive unit 90 (especially the inside of the sleeve member 106) are prevented from invasion of contaminated water or the like which has entered the housing 40 through the window 45. The exhaust gas, which has entered the housing 40 along the valve stem 38 through the first hole 64 of the first guide cover 60, the stem insertion hole 54 of the guide member 52, and the second hole 74 of the second guide cover 66, is discharged to the outside of the housing 40 via the vent holes 88 and the window 45.

The drive unit 90 comprises a first support member 92 and a second support member 94 each of which has an inner hole having a substantially columnar configuration. In the housing 40, the first support member 92 is arranged at an upper position, and the second support member 94 is arranged at a lower position to constitute a pair of magnetic pole members.

The first support member 92 comprises a first flange 96 which extends perpendicularly to the valve stem 38 and which has its end fixed to an upper portion of the housing 40, and a first cylindrical section 93 which extends along the valve stem 38.

On the other hand, the second support member 94 comprises a second flange 98 which extends perpendicularly to the valve stem 38 and which has its end fixed to a lower portion of the housing 40, and a second cylindrical section 97 which extends along the valve stem 38 and which is opposed to the first cylindrical section 93 of the first support member 92. In this embodiment, the second cylindrical section 97 is formed to have a tapered configuration with its outer circumference which has a smaller diameter at an upper position. This structure allows the electromagnetic force in the axial direction applied to a plunger 110 as described later on to be proportional to the position of the plunger 110. The first support member 92 and the second support member 94 are fixed to the inner surface of the side wall 42 respectively as described above by the aid of the first flange 96 and the second flange 98 formed on the respective outer circumferential surfaces. The flange 84 of the cover member 82 is secured to the lower surface of the second flange 98. A space is thus formed by the second support member 94, and the side wall 42 and the bottom wall 44 of the housing 40. This space communicates with the outside via the window 45. In this embodiment, the heat of the exhaust gas, which is transmitted to the inside of the housing 40 through the valve unit 20 and the guide unit 50, is discharged to the outside through the window 45. Accordingly, the drive unit 90 is prevented from transmission of the heat.

A coil 102 for driving the valve stem 38 is arranged in a space 100 which is formed by the first support member 92, the second support member 94, and the housing 40. The coil 102 is fixed by a spring washer 104. An illustrated power source unit is connected to the coil 102.

The sleeve member 106, which has a substantially cup-shaped configuration composed of a non-magnetic material, is inserted into the inner holes of the first support member 92 and the second support member 94, with its bottom surface disposed downward. The sleeve member 106 is fastened to the upper end of the first support member 92 by means of a projection 108 which is formed by outwardly bending the open upper end of the sleeve member 106. A bottom side displacement-preventive section, which serves to prevent the end of a first elastic member 132 described later on from displacement in the direction perpendicular to the axis, is provided on the bottom surface of the sleeve member 106. Actually, the bottom side displacement-preventive section is constructed by a recess 116 which is formed to have a substantially cup-shaped configuration convexed downwardly. A hole, through which the valve stem 38 inserted into the housing 40 passes, is defined through a substantially central portion of the sleeve member 106.

The plunger 110, which has a substantially cylindrical configuration composed of a magnetic material, is inserted into the sleeve member 106. The plunger 110 is displaceable on the inner surface of the sleeve member 106, and it is arranged coaxially with the valve stem 38. The plunger 110 and the valve stem 38 are coupled to one another by a coupling means 120 by the aid of a projection 112 which is formed on the inner surface of the plunger 110. In this embodiment, a predetermined gap is provided between the valve stem 38 and the projection 112 of the plunger 110. This arrangement allows relative displacement in the direction perpendicular to the axis between the plunger 110 and the valve stem 38. Therefore, it is allowable to cause any fluctuation of the valve stem 38 in the direction perpendicular to the axis associated with any misalignment or any defective shape of the respective members for constructing the plunger 110 or the coupling means 120. The driving operation of the valve stem 38 is not inhibited, which would be otherwise caused by the fluctuation as described above. In this embodiment, it is easy to produce the plunger 110 (especially the portion of the projection 112). Further, the guide member 52 for supporting the valve stem 38 can be formed to have a short size.

Figure 2:
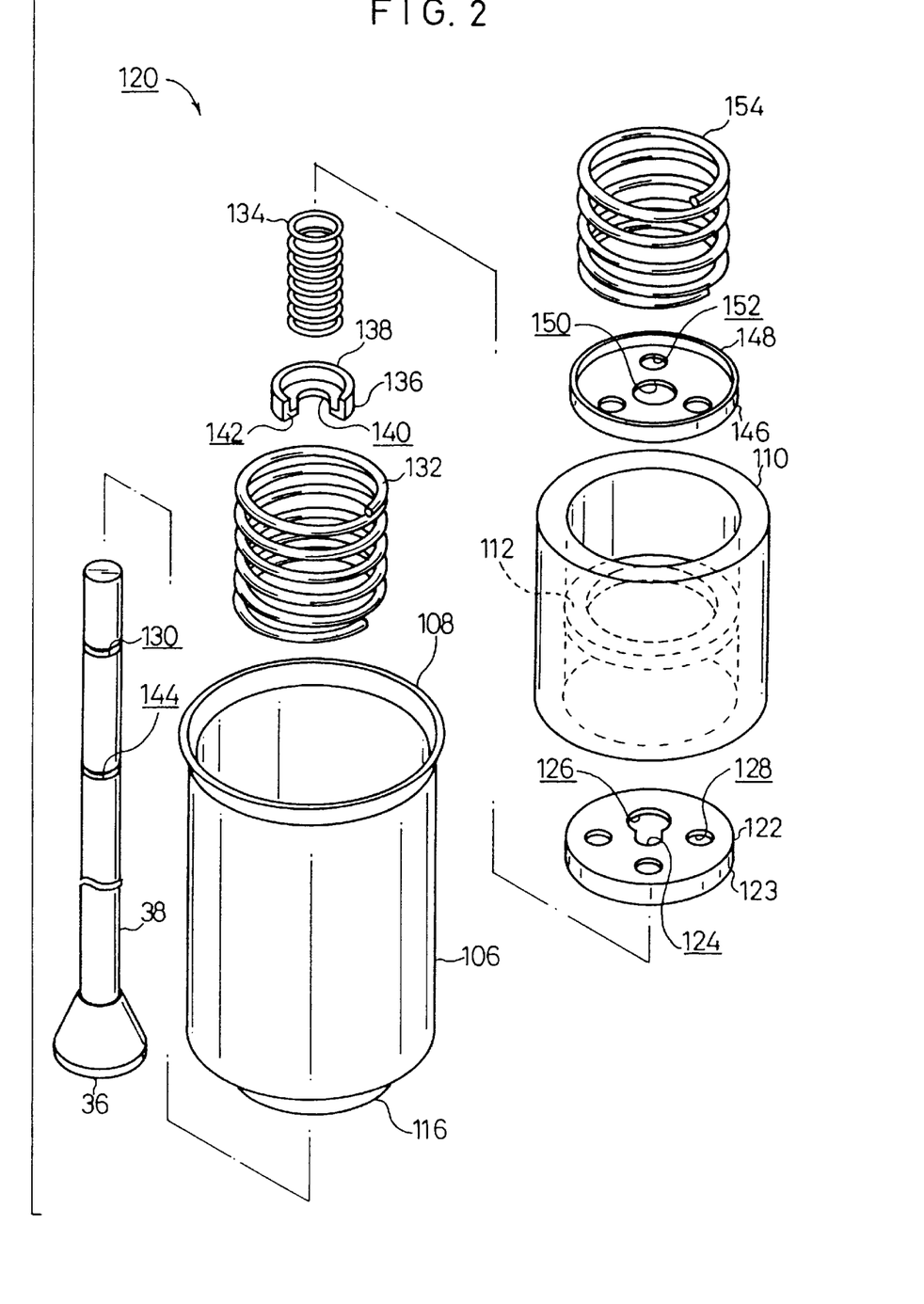
FIG. 2 shows an exploded perspective view illustrating a coupling means for a drive unit and a valve stem of the exhaust gas-recirculating valve shown in FIG. 1.

As shown in FIG. 2, the coupling means (coupling structure) 120 comprises a first retainer 122. The first retainer 122 corresponds to the diameter of the recess 116 formed on the bottom surface of the sleeve member 106, and it is formed to have a substantially disk-shaped configuration with a diameter which is smaller than the inner diameter of the plunger 110. A first bent section (displacement-preventive section) 123, which is bent in the downward direction, is provided in an integrated manner at the outer circumferential end of the first retainer 122. A first fastening hole 124 is defined through a substantially central portion of the first retainer 122. The first fastening hole 124 is in communication with an introduction hole 126 which has a diameter larger than that of the first fastening hole 124. In this embodiment, a plurality of ventilating through-holes 128 are defined through the first retainer 122. The first retainer 122 is fastened to the valve stem 38 by fitting the first fastening hole 124 to a first annular groove (retainer-fastening section) 130 which is defined on the outer circumferential surface of the valve stem 38. The first retainer 122 is fixed by the energizing action in the upward direction exerted by a first elastic member 132 and/or a second elastic member 134 (see FIG. 3).

The first elastic member 132 is generally a spring member which is formed to have a substantially cylindrical configuration with a diameter corresponding to the first retainer 122 and the recess 116 of the sleeve member 106 and which is arranged coaxially with the valve stem 38 between the first retainer 122 and the recess 116. In this arrangement, the first elastic member 132 is regulated for its displacement in the horizontal direction as shown in FIG. 1 by the first bent section 123 of the first retainer 122 and the inclined structure around the recess 116 (see FIGS. 1 and 3).

The second elastic member 134 is generally a spring member which is formed to have a substantially cylindrical configuration with a diameter smaller than that of the first elastic member 132 and which is arranged coaxially with the valve stem 38 at the inside of the first elastic member 132. The upper end of the second elastic member 134 abuts against the first retainer 122, and the lower end of the second elastic member 134 abuts against a second retainer (seat section, stopper) 136. The second elastic member 134 energizes the first retainer 122 in the upward direction, and it energizes the second retainer 136 in the downward direction. When energized by the second elastic member 134, the first retainer 122 is pressed and fixed to the first annular groove 130, and the second retainer 136 is pressed and fixed to a second annular groove (retainer-fastening section) 144. Therefore, when the valve stem 38 is subjected to the displacement action, neither vibration nor noise is generated from the contact portion between the first retainer 122 and the first annular groove 130 and from the contact portion between the second retainer 136 and the second annular groove 144. The first retainer 122 or the second retainer 136 is not disengaged from the valve stem 38. In this embodiment, the second elastic member 134 is regulated for its displacement in the horizontal direction as shown in FIG. 1 by the aid of the valve stem 38 and a second bent section (displacement-preventive section) 138 of the second retainer 136 (see FIG. 3).

The second retainer 136 is arranged on the valve stem 38 at a position separated from the first retainer 122 by a predetermined spacing distance in the downward direction. As shown in FIG. 2, the second retainer 136 is formed to have a substantially disk-shaped configuration with a diameter smaller than that of the first retainer 122 corresponding to the second elastic member 134. The second bent section 138, which is bent in the upward direction, is provided in an integrated manner at the outer circumferential end of the second retainer 136. The second elastic member 134 is regulated for its displacement in the horizontal direction as shown in FIG. 1 by the second bent section 138.

A second fastening hole 140 is defined through a substantially central portion of the second retainer 136. A cutout 142 is formed on the side thereof such that the second retainer 136 is cut out from the second fastening hole 140 to the end of the second retainer 136. The second fastening hole 140 is fitted to the second annular groove 144 which is formed on the valve stem 38. Thus, the second retainer 136 is fastened to the valve stem 38, and it is fixed by the energizing action in the downward direction effected by the second elastic member 134 (see FIG. 3). In this embodiment, the second retainer 136 regulates the lower limit of the plunger 110 by making abutment against the recess 116 of the sleeve member 106 (see FIG. 1). That is, the recess 116 functions as a movement range-regulating means.

A third retainer 146, which is displaceable on the valve stem 38, is arranged over the first retainer 122 along the valve stem 38. As shown in FIG. 2, the third retainer 146 is formed to have a substantially disk-shaped configuration with substantially the same diameter as that of the first retainer 122. A third bent section (displacement-preventive section) 148, which is bent in the upward direction, is provided in an integrated manner at the outer circumferential end of the third retainer 146. A slide hole 150 for inserting the valve stem 38 thereinto is defined through a substantially central portion of the third retainer 146. A plurality of through-holes 152 are defined around the slide hole 150. The third retainer 146 is energized in the downward direction by the third elastic member 154 (see FIG. 1).

The third elastic member 154 is generally a spring member which is formed to have a substantially cylindrical configuration with substantially the same diameter as that of the first elastic member 132 corresponding to the third retainer 146 and which is arranged coaxially with the valve stem 38 between the third retainer 146 and a sensor case 162. The third elastic member 154 is regulated for its displacement in the horizontal direction as shown in the drawings by a third bent section 148 of the third retainer 146 and an outer circumferential surface of a bearing 166 formed at the lower end of the sensor case 162 (see FIGS. 1 and 2).

The projection 112, which protrudes toward the valve stem 38, is formed on the plunger 110. The third retainer 146 abuts against the upper surface of the projection 112, and the first retainer 122 abuts against the lower surface thereof (see FIG. 1). In this embodiment, the first elastic member 132 and the third elastic member 154 abut against the projection 112 via the first retainer 122 and the third retainer 146 respectively. Accordingly, neither damage nor abrasion occurs in the projection 112. When a coating is applied to the plunger 110, the coating is not peeled off (hereinafter referred to as "damage or the like").

When neither current nor voltage is applied to the coil 102, the plunger 110 is stopped at the upper limit position by being energized in the upward direction by the first elastic member 132. At this time, the valve plug 36 is seated on the valve seat 34 (valve-closed state). In this arrangement, the third elastic member 154 energizes the plunger 110 in the downward direction via the third retainer 146. Thus, the buffering action is effected for the shock which is generated upon the collision of the plunger 110 with the lower surface of the sensor case 162 and upon the collision of the valve plug 36 with the valve seat 34. The projection 112 of the plunger 110 always abuts against the first retainer 122 and the third retainer 146. Accordingly, the vibration is avoided, which would be possibly generated when the first retainer 122 or the third retainer 146 is separated from the projection 112 to make collision.

The gap, which is provided between the valve stem 38 and the projection 112, communicates with the through-holes 128 of the first retainer 122 and the through-holes 152 of the third retainer 146. Accordingly, the upper side of the plunger 110 communicates with the lower side thereof. Thus, the air resistance, which is generated during the displacement action of the plunger 110, is reduced.

The sensor unit 160 is provided with the sensor case 162 which is formed of, for example, a material made of resin for accommodating the sensor unit 160. The sensor case 162 is connected to an upper portion of the housing 40. In this embodiment, the sensor case 162 and the housing 40 are tightly sealed by an O-ring 163 disposed therebetween.

The sensor unit 160 comprises a sensor rod 164 which is coupled to an unillustrated sensor and which is supported by the bearing 166. The forward end of the sensor rod 164 is coupled to the backward end of the valve stem 38. The open/closed state of the valve unit 20 effected by the valve plug 36 is transmitted to the sensor via the valve stem 38 and the sensor rod 164 to be measured by the sensor. A result of the measurement is fed to an unillustrated control circuit via an unillustrated connector which is arranged in the sensor case 162. An unillustrated connector for connecting the coil 102 and the unillustrated power source unit is arranged in the sensor case 162. The connecting portion between the sensor case 162 and the housing 40 is fixed by a fixing means 170.

The fixing means 170 is constructed by a crown-shaped elastic member 172. An annular groove 190 having a substantially angular U-shaped cross section is defined on the outer circumferential surface on the upper end side of the housing 40 to which the crown-shaped elastic member 172 is attached. A step section 192 is formed on the outer circumferential surface on the lower end side of the sensor case 162. The crown-shaped elastic member 172 is installed to a jointing portion of the sensor case 162 and the housing 40 by the aid of the annular groove 190 and the step section 190. Thus, the sensor case 162 and the housing 40 are fixed.

The crown-shaped elastic member 172 has an annular cylindrical section 174 corresponding to the shape of the outer circumferential surfaces of the sensor case 162 and the housing 40 to which the crown-shaped elastic member 172 is attached. A flange 176, which is directed inwardly, is provided in an integrated manner at the upper end of the cylindrical section 174. In this embodiment, the crown-shaped elastic member 172 is formed of, for example, a material made of metal excellent is elasticity. The flange 176 abuts against the step section 192 of the sensor case 162, and it presses the sensor case 162 by means of its resilient force.

The cylindrical section 174 is provided with a plurality of cut-and-raised sections 180 at positions corresponding to the annular groove 190 of the housing 40. The cut-and-raised sections 180 are fastened to the annular groove 190. Thus, the crown-shaped elastic member 172 is prevented from disengagement. That is, the crown-shaped elastic member 172 fixes the joining surfaces of the sensor case 162 and the housing 40 in accordance with the interaction between the fastening action of the cut-and-raised sections 180 to the annular groove 190 and the pressing action of the flange 176 against the step section 192.

The EGR valve 10 according to the embodiment of the present invention is basically constructed as described above. Next, its operation, function, and effect will be explained.

At first, the assembling operation for the coupling means 120 will be explained.

The valve stem 38 is inserted into the housing 40. The second retainer 136 is attached, with the second fastening hole 140, to the second annular groove 144 formed on the valve stem 38. In this embodiment, the second retainer 136 is in a state in which the second bent section 138 is disposed upward. The second elastic member 134 is attached to the valve stem 38 so that valve stem 38 passes therethrough. The lower end of the second elastic member 134 is allowed to abut against the upper surface of the second retainer 136 (at the inside of the second bent section 138). The first elastic member 132 is attached to the valve stem 38 so that the second elastic member 134 is covered therewith. The lower end of the first elastic member 132 is allowed to abut against the recess 116 of the sleeve member 106.

Next, the first retainer 122 is attached to the valve stem 38 by the aid of the introduction hole 126. In this embodiment, the first bent section 123 is disposed downward. The first elastic member 132 and the second elastic member 134 are allowed to abut against the lower surface of the first retainer 122 (at the inside of the first bent section 123). Subsequently, the first retainer 122 is pressed and lowered in opposition to the resilient force of the first elastic member 132 and the second elastic member 134. The first fastening hole 124 is fitted to the first annular groove 130 of the valve stem 38. Thus, the first retainer 122 is fastened to the valve stem 38. In this embodiment, the first retainer 122 is fixed to the first annular groove 130 by the aid of the energizing action in the upward direction effected by the first elastic member 132 and/or the second elastic member 134. The second retainer 136 is also fixed to the second annular groove 144 by the aid of the energizing action in the downward direction effected by the second elastic member 134.

Next, the plunger 110 is inserted into the sleeve member 106 coaxially with the valve stem 38. The projection 112 is allowed to abut against the upper surface of the first retainer 122. The slide hole 150 is used to slidably attach the third retainer 146 to the valve stem 38. In this embodiment, the third retainer 146 is arranged so that the third bent section 148 is disposed upward. The lower surface of the third retainer 146 is allowed to abut against the projection 112.

Next, the third elastic member 154 is attached coaxially with the valve stem 38. The lower end of the third elastic member 154 is allowed to abut against the upper surface of the third retainer 146 (at the inside of the third bent section 148). The upper end of the housing 40 is covered with the sensor case 162 so that the upper end of the third elastic member 154 abuts against the outer circumferential surface of the bearing 166 formed on the lower end of the sensor case 162. The sensor case 162 is pressed and lowered in opposition to the resilient force of the third elastic member 154. The housing 40 and the sensor case 162 are fixed by means of the fixing means 170. The valve stem 38 is coupled to the sensor rod 164. Thus, the assembling operation for the coupling means 120 is completed.

In this embodiment, the first retainer 122 and the second retainer 136 are fastened to the first annular groove 130 and the second annular groove 144 respectively, and they are fixed by the aid of the energizing action in the vertical direction effected by the first elastic member 132 and/or the second elastic member 134. The third retainer 146 is energized in the downward direction by the third elastic member 154. The plunger 110 is interposed in accordance with the energizing action effected by the first elastic member 132 and the third elastic member 154 by the aid of the first retainer 122 and the third retainer 146. Therefore, the coupling means 120 can be constructed in accordance with the convenient structure and the convenient procedure in which the respective members are assembled. It is unnecessary to use, for example, any means for securing the plunger 110 and the valve stem 38, unlike the respective illustrative conventional techniques described above.

Next, the operation of the EGR valve 10 will be explained.

In the EGR valve 10, the valve-opening operation is performed for the valve unit 20 by applying a current or a voltage to the coil 102 of the drive unit 90. The valve-closing operation is performed for the valve unit 20 by stopping the application of the current or the voltage to the coil 102.

That is, when the current or the voltage having a predetermined value is applied from the unillustrated power source unit to the coil 102 on the basis of the instruction given by the unillustrated control circuit, the magnetic field is generated from the coil 102. The magnetic field allows the plunger 110 to receive the electromagnetic force so that the plunger 110 is moved in the downward direction. In this embodiment, the second cylindrical section 97 of the second support member 94 is formed to have the tapered configuration in which the outer circumference is decreased in diameter at upper positions. Therefore, the electromagnetic force in the axial direction applied to the plunger 110 is proportional to the position of the plunger 110.

The plunger 110 presses the first retainer 122 by the aid of the projection 112 to make the displacement in the downward direction in opposition to the resilient force of the first elastic member 132. During this process, the valve stem 38, which is coupled to the first retainer 122, is displaced in the downward direction in accordance with the guiding action of the guide member 52. Accordingly, the valve plug 36, which is coupled to the valve stem 38, is displaced in the downward direction, and it is separated from the valve seat 34. Thus, the inlet port 26 communicates with the outlet port 28 (valve-open state). The plunger 110 is stopped at a position at which the electromagnetic force balances with the resilient force of the first elastic member 132. That is, the open/closed amount of the valve unit 20 is determined by the magnitude of intensity of the current or the voltage applied to the coil 102.

Next, when the application of the current or the voltage to the coil 102 is stopped, the plunger 110 is raised in accordance with the energizing action in the upward direction effected by the resilient force of the first elastic member 132. Accordingly, the valve stem 38 is displaced in the upward direction in accordance with the guiding action of the guide member 52. The valve plug 36 coupled to the valve stem 38 is seated on the valve seat 34. Thus, the inlet port 26 is closed (valve-closed state).

The open/closed state of the inlet port 26, which is determined by the valve plug 36 as described above, is transmitted to the unillustrated sensor via the valve stem 38 and the sensor rod 164. The result of measurement performed by the sensor is fed to the control circuit in a feedback manner.

In this embodiment, the lower limit positions of the plunger 110 and the valve stem 38 are regulated by the second retainer 136 which is provided on the valve stem 38. Accordingly, it is possible to accurately determine the lower limit positions of the plunger 110 and the valve stem 38. Therefore, the plunger 110 never collides with the bottom surface of the sleeve member 106. Any damage or the like is not caused in the plunger 110. The region of the bottom surface of the sleeve member 106, against which the second retainer 136 abuts, is the substantially central portion of the bottom surface of the sleeve member 106. Accordingly, the bottom surface of the sleeve member 106 buffers the shock which is brought about when the second retainer 136 makes the abutment. Thus, the noise generated by the collision is reduced.

When the valve unit 20 is fully open, the second retainer 136 abuts against the bottom surface of the sleeve member 106 to close the hole formed through the bottom surface of the sleeve member 106. Therefore, the inside of the sleeve member 106 is prevented from invasion of the exhaust gas through the hole.

The area of the lower surface of the second retainer 136 is smaller than the area of the lower end of the plunger 110. Therefore, the resistance force (for example, any resistance force resulting from the adhesive force of lubricating oil or the like) is small when the second retainer 136 is separated from the bottom surface of the sleeve member 106.

The third elastic member 154 energizes the plunger 110 in the downward direction by the aid of the third retainer 146 to buffer the shock brought about when the plunger 110 collides with the lower surface of the sensor case 162. Accordingly, no damage or the like occurs in the plunger 110 upon the collision. The third elastic member 154 buffers the shock by the aid of the first retainer 122 and the valve stem 38 when the valve plug 36 collides with the valve seat 34. Accordingly, no damage or the like occurs in the valve plug 36 or the valve seat 34 upon the collision.

Since the plunger 110 and the first retainer 122 are not coupled directly to one another, the inertial force of the plunger 110 is not applied to the valve stem 38 during the valve-closing operation. Therefore, when the valve plug 36 collides with the valve seat 34, the valve plug 36 or the valve seat 34 is prevented from occurrence of any damage or the like.

The projection 112 of the plunger 110 is allowed to always abut against the first retainer 122 and the third retainer 146 in accordance with the energizing action in the downward direction effected by the third elastic member 154. Accordingly, any occurrence of vibration or noise is avoided, which would be otherwise caused by separation and collision between the projection 112 and the first retainer 122 or the third retainer 146. Therefore, it is possible to perform the displacement action of the valve stem 38 accurately and silently.

The first retainer 122 and the third retainer 146 intervene between the projection 112 of the plunger 110 and the first elastic member 132 and the third elastic member 154 respectively. Accordingly, any damage or the like does not occur in the projection 112.

The first retainer 122 is fastened to the first annular groove 130, and it is pressed and fixed to the first annular groove 130 in accordance with the energizing action in the upward direction effected by the first elastic member 132 and/or the second elastic member 134. The second retainer 136 is fastened to the second annular groove 144, and it is pressed and fixed to the second annular groove 144 in accordance with the energizing action in the downward direction effected by the second elastic member 134. This arrangement allows the first retainer 122 and the second retainer 136 to always make displacement integrally with valve stem 38. Thus, neither vibration nor noise is generated from the contact portion between the first retainer 122 and the first annular groove 130 or from the contact portion between the second retainer 136 and the second annular groove 144. Therefore, it is possible to perform the displacement action of the valve stem 38 in a silent manner. Further, no deviation in timing occurs between the plunger 110 and the valve stem 38. Accordingly, the displacement action of the valve stem 38 is accurately performed.

The plunger 110 and the valve stem 38 are not directly secured to one another. Further, the predetermined gap is provided between the projection 112 of the plunger 110 and the valve stem 38. Accordingly, the relative displacement is allowable in the direction perpendicular to the axis between the valve stem 38 and the plunger 110. Therefore, the driving operation of the valve stem 38 is not inhibited due to any fluctuation in the direction perpendicular to the axis of the valve stem 38 associated with any misalignment or defective shape of the respective members for constructing the plunger 110 or the coupling means 120. In this arrangement, it is easy to produce the respective members for constructing the plunger 110 (especially the portion of the projection 112) and the coupling means 120. The guide member 52, which supports the valve stem 38, can be constructed to be short in size. Thus, it is possible to obtain the EGR valve 10 having the compact size at low cost.

The ventilating through-holes 128, 152 are defined through the first retainer 122 and the third retainer 146 respectively. The upper side of the plunger 110 communicates with the lower side thereof by the aid of the through-holes 128, 152 and the gap provided between the projection 112 of the plunger 110 and the valve stem 38. Therefore, the air resistance, which is generated during the displacement action of the plunger 110, is reduced. This arrangement makes it unnecessary to process and form the projection 112 of the plunger 110 to have any hole or the like for making communication with the through-holes 128, 152. Thus, it is possible to simplify the production steps for the plunger 110.

The first retainer 122, the second retainer 136, and the third retainer 146 are formed to have the substantially cup-shaped configurations as those formed separately from the valve stem 38. Accordingly, they can be easily produced by means of press working or the like, including formation of the through-holes 128, 152. Therefore, the coupling means 120 can be produced at low cost for a short period of time.

Figure 3:
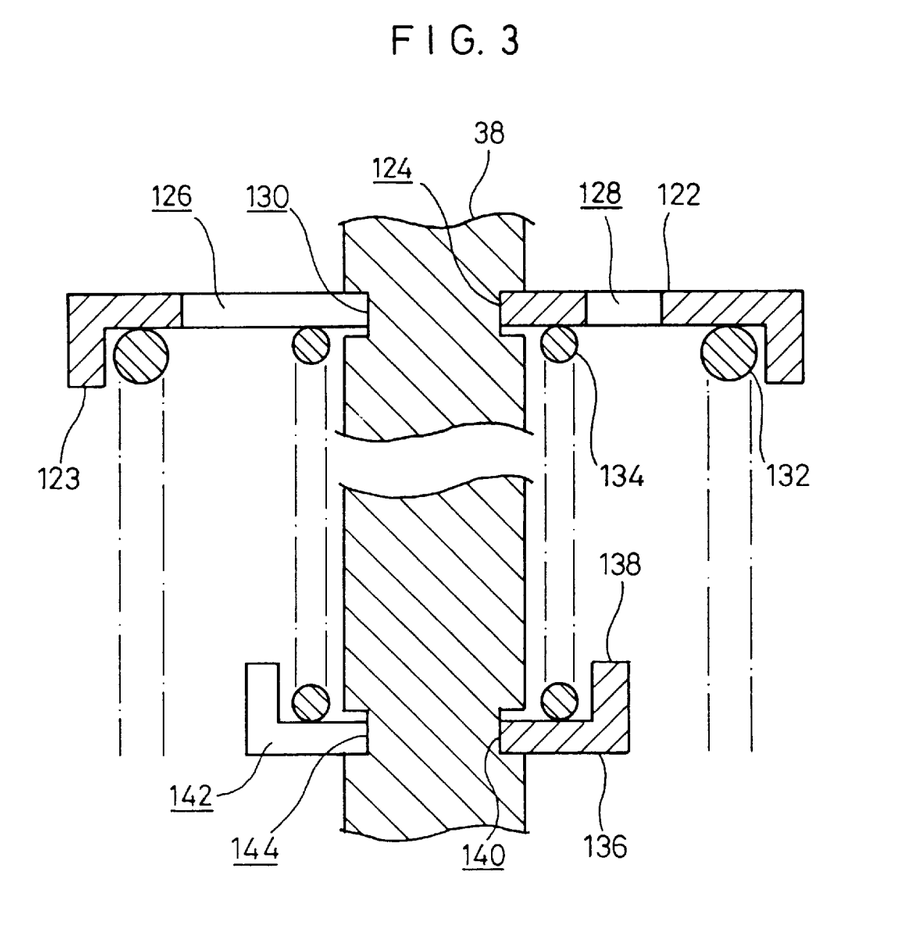
FIG. 3 shows a partial sectional view illustrating the coupling means for the drive unit and the valve stem of the exhaust gas-recirculating valve shown in FIG. 1.

The second elastic member 134 is arranged coaxially at the inside of the first elastic member 132. Accordingly, the coupling means 120 can be constructed in a space-saving manner.

Various modifications may be applied to the EGR valve 10 according to the embodiment of the present invention constructed as described above.

Figure 4:
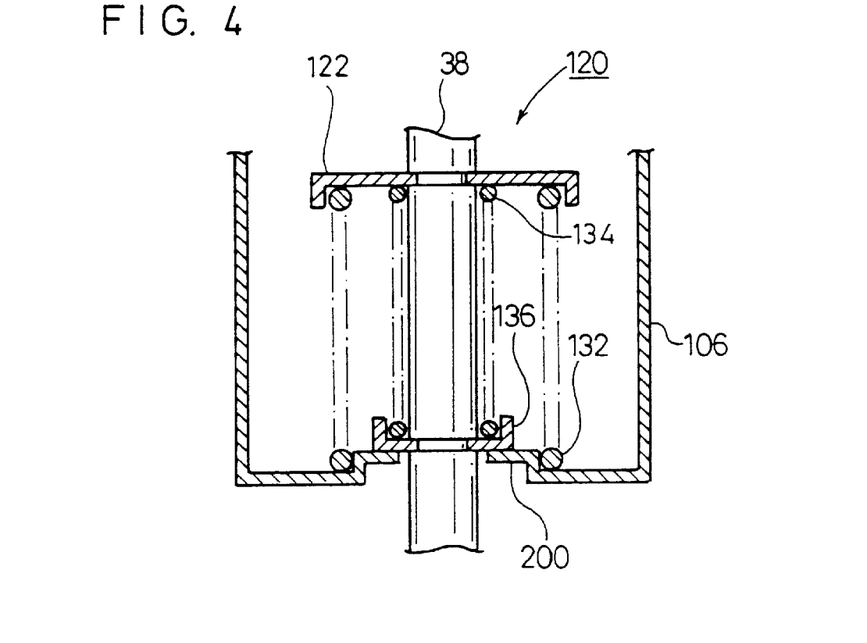
FIG. 4 shows a partial sectional view illustrating a modified embodiment especially concerning the coupling means of the exhaust gas-recirculating valve according to the embodiment of the present invention.

For example, as shown in FIG. 4, an inverted cup-shaped projection 200, which is convexed upwardly, may be provided as a bottom side displacement-preventive section on the bottom surface of the sleeve member 106. In this embodiment, the lower end of the first elastic member 132 is regulated for the displacement in the horizontal direction as shown in FIG. 4 by the aid of the outer circumferential surface of the projection 200. The projection 200 also serves as a movement range-regulating means for regulating the lower limit of the plunger 110 in accordance with the abutment of the second retainer 136 against the upper surface of the projection 200.

Figure 5:
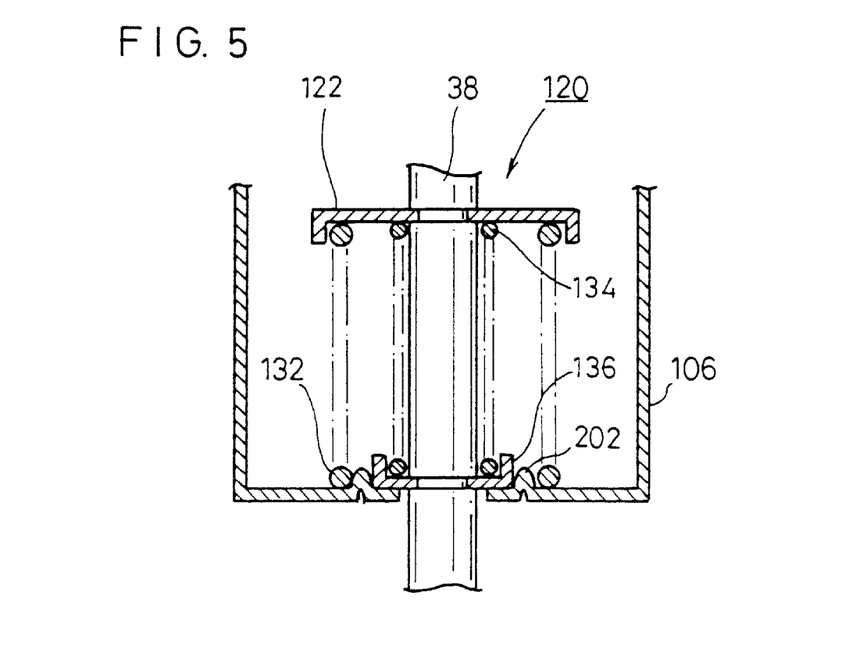
FIG. 5 shows a partial sectional view illustrating a modified embodiment especially concerning the coupling means of the exhaust gas-recirculating valve according to the embodiment of the present invention.

Alternatively, as shown in FIG. 5, a substantially annular rim 202, which is convexed upwardly, may be provided as a bottom side displacement-preventive section and a movement range-regulating means on the bottom surface of the sleeve member 106.

Figure 6:
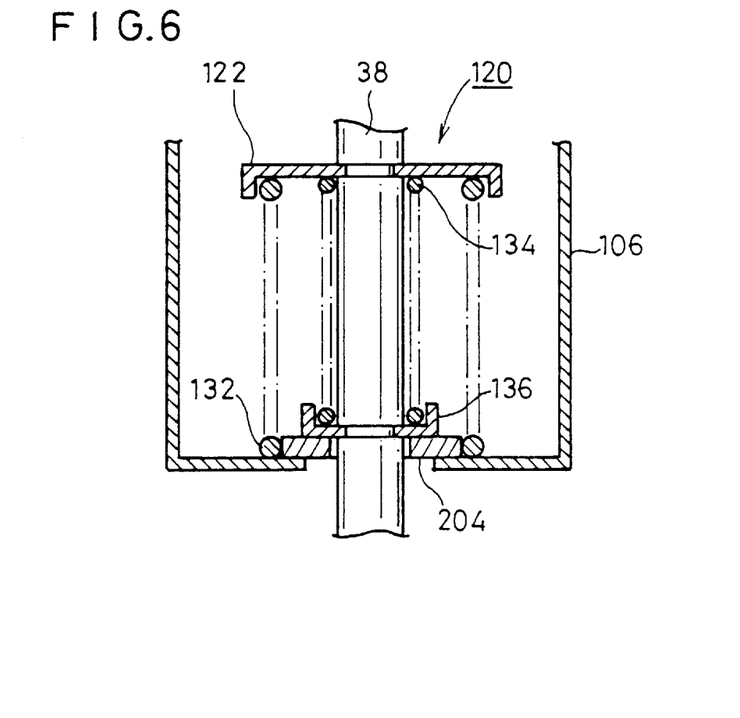
FIG. 6 shows a partial sectional view illustrating a modified embodiment especially concerning the coupling means of the exhaust gas-recirculating valve according to the embodiment of the present invention.

Further alternatively, as shown in FIG. 6, a ring-shaped washer (buffering member) 204 may be provided as a movement range-regulating means for regulating the lower limit of the plunger 110 on the bottom surface of the sleeve member 106. In this embodiment, the second retainer 136 abuts against the upper surface of the washer 204 at its lower limit position. Therefore, it Is possible to buffer the shock brought about when the second retainer 136 collides with the washer 204. The washer 204 also serves as a bottom side displacement-preventive section. The lower end of the first elastic member 132 is regulated for the displacement in the horizontal direction as shown in FIG. 6 by the aid of the outer circumferential surface of the washer 204.

Figure 7:
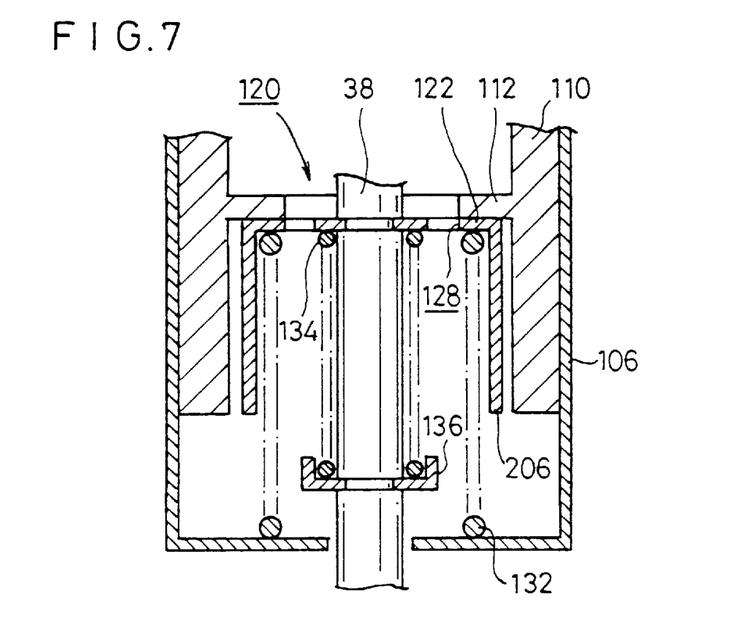
FIG. 7 shows a partial sectional view illustrating a modified embodiment especially concerning the coupling means of the exhaust gas-recirculating valve according to the embodiment of the present invention.

Further alternatively, as shown in FIG. 7, a cylindrical section 206, which extends in the downward direction, may be provided as a displacement-preventive section, at the outer circumferential end of the first retainer 122. In this embodiment, the first elastic member 132 is regulated for the displacement in the horizontal direction as shown in FIG. 7, by the aid of the inner surface of the cylindrical section 206. Therefore, it is unnecessary to apply any processing to the bottom surface of the sleeve member 106 for regulating the displacement of the first elastic member 132. Thus, it is possible to simplify the projection steps for the sleeve member 106.

In the embodiment of the present invention, the bottom surface of the sleeve member 106 is used to construct the bottom side displacement-preventive section for preventing the lower end of the first elastic member 132 from the displacement in the direction perpendicular to the axis, and the movement range-regulating means for regulating the lower limit of the valve stem 38 and the plunger 110 in accordance with the abutment of the second retainer 136. However, it is also preferable to provide another bottom side displacement-preventive section and another movement range-regulating means in place of the bottom surface of the sleeve member 106.

The second retainer 136 may be arranged so that it is secured to the valve stem 38. Further, the second retainer 136 may be replaced with, for example, a brim-shaped member (seat section, stopper) which is formed integrally with the valve stem 38.

According to the valve apparatus of the present invention, it is easy to perform the processing and assembling operations for the respective constitutive members, it is possible to suppress occurrence of vibration or noise as less as possible, and it is possible to preferably buffer the shock brought about when the retainer collides with the sleeve member or the like and the shock brought about when the valve plug collides with the valve seat. Therefore, according to the present invention, it is possible to obtain the valve apparatus having the simple and convenient structure and having the excellent durability in which the valve stem can be driven accurately and silently by the aid of the drive unit.

What is claimed is:

1. A valve apparatus comprising:
    a valve stem having, at its forward end, a valve plug which faces a fluid flow passage;
    a drive unit for displacing said valve stem to open and close said fluid flow passage; and
    a coupling means for coupling said valve stem and said drive unit to one another, wherein:
    said drive unit comprises a plunger for being energized to move at least in a first direction along an axial direction of said valve stem;
    said valve stem comprises a retainer-fastening section; and
    said coupling means comprises:
        a retainer fastened to said retainer-fastening section, for making, with its first surface, abutment against a first surface of said plunger to displace said valve stem in said first direction together with said plunger;
        an elastic member for making abutment against a second surface of said retainer to perform an energizing action to move said valve stem in a second direction along said axial direction of said valve stem by the aid of said retainer; and
        a retainer-fixing mechanism for fixing said retainer to said retainer-fastening section to prevent said retainer from displacement with respect to said valve stem.

2. The valve apparatus according to claim 1, wherein said retainer-fixing mechanism comprises:
    a seat section provided on said valve stem and separated from said retainer by a predetermined spacing distance; and
    another elastic member arranged between said retainer and said seat section, for pressing and fixing said retainer to said retainer-fastening section.

3. The valve apparatus according to claim 2, wherein:
    said valve stem is provided with another retainer-fastening section which is separated from said retainer-fastening section by a predetermined spacing distance; and
    said seat section is constructed by another retainer which is fastened to said another retainer-fastening section and which is pressed and fixed to said another retainer-fastening section by the aid of said another elastic member.

4. The valve apparatus according to claim 3, wherein said another elastic member is arranged coaxially around said valve stem at the inside of said elastic member.

5. The valve apparatus according to claim 1, wherein:
    said drive unit comprises a sleeve member for surrounding said plunger;
    an end of said elastic member is seated and positioned on a bottom surface of said sleeve member; and
    a bottom side displacement-preventive section for preventing said elastic member from displacement in a direction perpendicular to an axis of said valve stem is provided at a position to make abutment against said end of said elastic member on said bottom surface of said sleeve member.

6. The valve apparatus according to claim 5, wherein said bottom side displacement-preventive section is constructed by a buffering member.

7. The valve apparatus according to claim 5, wherein said bottom side displacement-preventive section comprises a concave recess corresponding to an outer circumferential configuration of said end of said elastic member.

8. The valve apparatus according to claim 5, wherein said bottom side displacement-preventive section comprises a convex expanded section corresponding to an inner circumferential configuration of said end of said elastic member.

9. The valve apparatus according to claim 5, wherein said bottom side displacement-preventive section comprises a convex rim corresponding to an inner or outer circumferential configuration of said end of said elastic member.

10. The valve apparatus according to claim 1, wherein said coupling means comprises:
    a stopper provided on said valve stem; and
    a movement range-regulating means for regulating a movement range of said valve stem by making abutment against said stopper when said stopper is moved together with said valve stem in accordance with an energizing action effected by said drive unit.

11. The valve apparatus according to claim 10, wherein said retainer-fixing mechanism comprises:
    a seat section provided on said valve stem and separated from said retainer by a predetermined spacing distance; and
    another elastic member arranged between said retainer and said seat section, for pressing and fixing said retainer to said retainer-fastening section, and wherein:
    said seat section is also used as said stopper.

12. The valve apparatus according to claim 10, wherein:
    said drive unit comprises a sleeve member for surrounding said plunger;
    an end of said elastic member is seated and positioned on a bottom surface of said sleeve member;
    a bottom side displacement-preventive section for preventing said elastic member from displacement in a direction perpendicular to an axis of said valve stem is provided at a position to make abutment against said end of said elastic member on said bottom surface of said sleeve member; and
    said bottom surface of said sleeve member, on which said bottom side displacement-preventive section is provided, is also used as said movement range-regulating means.

13. The valve apparatus according to claim 1, wherein said coupling means comprises:
    still another retainer arranged on said valve stem, for making abutment against a second surface of said plunger; and
    still another elastic member for energizing said still another retainer to displace in said first direction, and wherein:
    said still another retainer is pressed to always make abutment against said plunger by the aid of a resilient force of said still another elastic member.

14. The valve apparatus according to claim 13, wherein:
    ventilating through-holes are defined through said retainer and/or said still another retainer;
    a gap is provided between said plunger and said valve stem; and
    said through-holes communicate with said gap.

15. The valve apparatus according to claim 1, wherein said retainer is provided with a displacement-preventive section for preventing an end of said elastic member for making abutment against said retainer, from displacement in a direction perpendicular to an axis of said valve stem.

16. The valve apparatus according to claim 1, wherein:

said retainer is provided with a displacement-preventive section which extends from said retainer along said valve stem so that said elastic member is surrounded thereby; and said displacement-preventive section prevents said elastic member from displacement along a direction perpendicular to an axis of said valve stem.

17. The valve apparatus according to claim 3, wherein said another retainer is provided with another displacement-preventive section for preventing an end of said another elastic member for making abutment against said another retainer, from displacement in a direction perpendicular to an axis of said valve stem.

18. The valve apparatus according to claim 13, wherein said still another retainer is provided with still another displacement-preventive section for preventing an end of said still another elastic member for making abutment against said still another retainer, from displacement in a direction perpendicular to an axis of said valve stem.

19. A valve apparatus comprising:

a valve stem having, at its forward end, a valve plug which faces a fluid flow passage;

a drive unit for displacing said valve stem to open and close said fluid flow passage; and a coupling means for coupling said valve stem and said drive unit to one another, wherein:

said drive unit comprises:

a plunger for being energized to move at least in a first direction along an axial direction of said valve stem; and a sleeve member for surrounding said plunger;

said valve stem comprises a retainer-fastening section; and said coupling means comprises:

a retainer fastened to said retainer-fastening section, for making, with its first surface, abutment against a first surface of said plunger to displace said valve stem in said first direction together with said plunger;

an elastic member for making abutment against a second surface of said retainer to perform an energizing action to move said valve stem in a second direction along said axial direction of said valve stem by the aid of said retainer;

a retainer-fixing mechanism for fixing said retainer to said retainer-fastening section to prevent said retainer from displacement with respect to said valve stem; and a stopper provided on said valve stem, and wherein:

a movement range of said valve stem is regulated by making abutment against a bottom surface of said sleeve member when said stopper is moved together with said valve stem in accordance with an energizing action effected by said drive unit.

20. A valve apparatus comprising:

a valve stem having, at its forward end, a valve plug which faces a fluid flow passage;

a drive unit for displacing said valve stem to open and close said fluid flow passage; and a coupling means for coupling said valve stem and said drive unit to one another, wherein:

said drive unit comprises a plunger for being energized to move at least in a first direction along an axial direction of said valve stem;

said valve stem comprises a retainer-fastening section; and said coupling means comprises:

a retainer fastened to said retainer-fastening section, for making, with its first surface, abutment against a first surface of said plunger to displace said valve stem in said first direction together with said plunger;

an elastic member for making abutment against a second surface of said retainer to perform an energizing action to move said valve stem in a second direction along said axial direction of said valve stem by the aid of said retainer;

a retainer-fixing mechanism for fixing said retainer to said retainer-fastening section to prevent said retainer from displacement with respect to said valve stem;

a stopper provided on said valve stem; and a movement range-regulating means for regulating a movement range of said valve stem by making abutment against said stopper when said stopper is moved together with said valve stem in accordance with an energizing action effected by said drive unit.

* * * * *